United States Patent

[11] 3,583,584

[72] Inventor Robert J. Iacco
  Highland Heights, Ohio
[21] Appl. No. 850,974
[22] Filed Aug. 18, 1969
[45] Patented June 8, 1971
[73] Assignee McNeil Corporation
  Akron, Ohio

[54] WAREHOUSING
  1 Claim, 4 Drawing Figs.
[52] U.S. Cl. .................................................. 214/16.4,
  214/38
[51] Int. Cl. ...................................................... B65g 1/06
[50] Field of Search ........................................... 214/16 (B),
  16.4, 16.42, 16.14

[56] References Cited
  UNITED STATES PATENTS
1,643,489  9/1927  Fitch ........................... 214/16.4
3,279,626  10/1966  De Roumefort .............. 214/16.1
3,460,686  8/1969  Cole ............................ 214/14

Primary Examiner—Gerald M. Forlenza
Assistant Examiner—Raymond B. Johnson
Attorney—Watts, Hoffmann, Fisher & Heinke ABSTRACT: A method of and multilevel warehouse for handling and storing material or devices, and more particularly cargo containers transported to and from a loading and unloading station on railway flat car automotive trucks and the like, which station is below a hoist which lifts a container to be stored to an elevation above the level upon which the container is to be stored, a combination transfer car having a shuttle car thereon normally at a hold position adjacent to the hoist on the level at which the container is to be stored and movable into and out of a position underneath the hoist and along an aisle or storage bay at the storage level and a position in alignment with a storage compartment at either side of the aisle. The shuttle car on the transfer car is movable into and out of a storage compartment and has an elevatable container support by which a container can be lowered onto or removed from supports in the compartment.

PATENTED JUN 8 1971

INVENTOR.
ROBERT J. IACCO

BY Watts, Hoffmann,
Fisher & Heinke
ATTORNEYS.

WAREHOUSING

FIELD OF INVENTION

The current practice of transporting or shipping articles in large cargo containers requires the storage of such containers at suitable locations in the transportation system and the present invention while having a more general application is particularly concerned with providing an inexpensive, convenient system or method of and multilevel warehouse for handling and storing cargo containers.

SUMMARY OF INVENTION

The present invention provides a warehouse or warehouse system having a plurality of storage levels each provided with a plurality of storage compartments at one or both sides of an aisle storage bay and having load supports therein, a power-actuated overhead hoist in a hoist by at one end of the storage bays and having a load grab, a power-actuated transfer car at each of the levels movable along the aisle of the respective level and into the hoist bay, a power-actuated shuttle car on each of the transfer cars movable transversely of the direction of movement of the transfer car into a selected storage compartment along the aisle, a power-actuated elevatable load carrier on each of the transfer cars, and control means for actuating the hoist, transfer cars, shuttle cars, etc., to automatically move loads into and out of the warehouse.

DESCRIPTION OF PREFERRED EMBODIMENT

Figure 1:
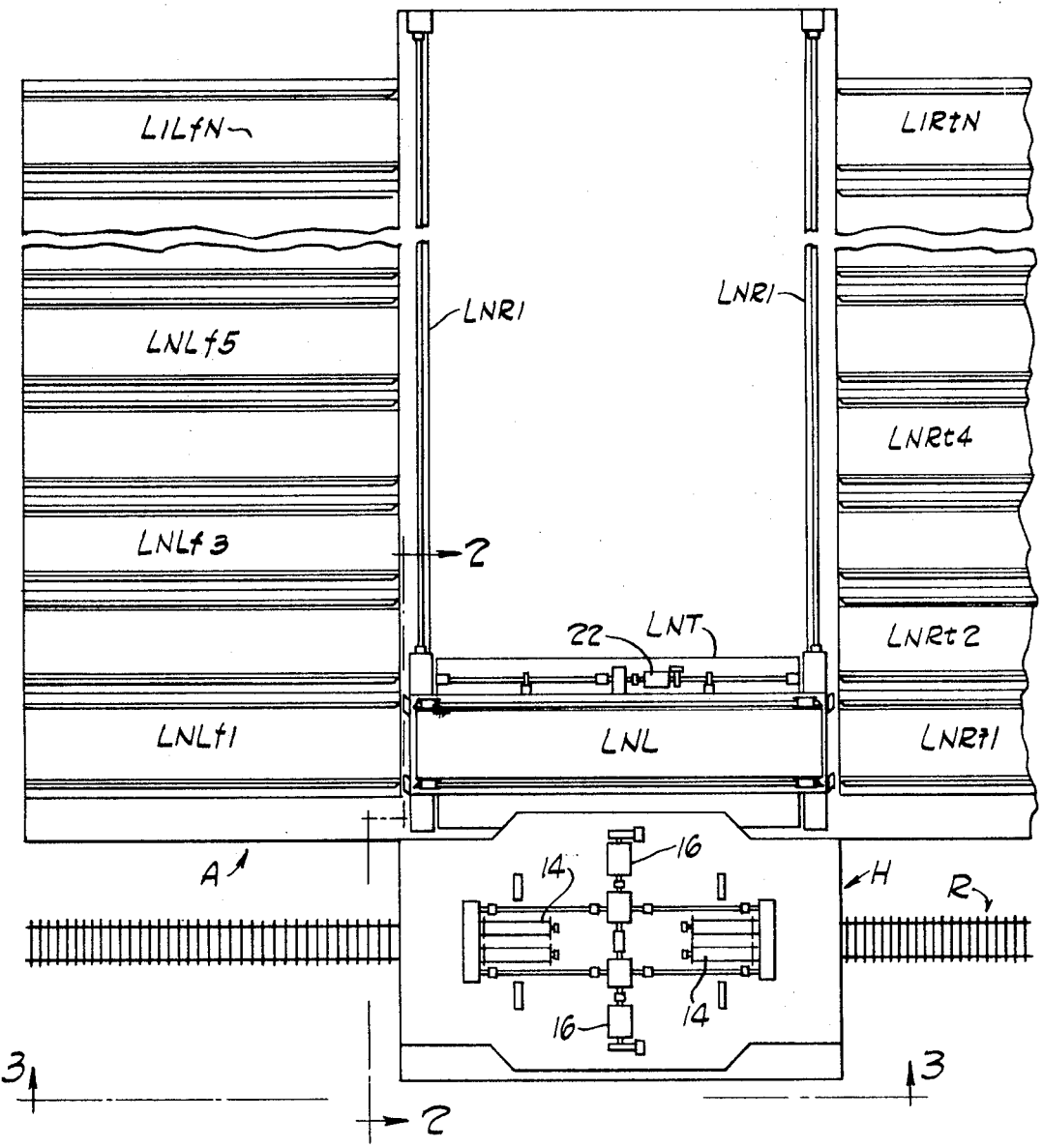
FIG. 1 is a fragmentary plan view of a multilevel warehouse embodying the present invention.

This invention can be embodied in warehouses of various designs and constructions and utilized for storing articles other than cargo containers, and the embodiment shown in the drawings and herein described is merely illustrative of the invention and it is not the intention that the invention is limited thereby but merely by the scope of the appended claims.

Referring to the drawings, the reference character A designates generally a warehouse of open steel construction having a plurality of storage levels designed from bottom to top as L1, L2 to LN. Each level, L1 etc., has an aisle or storage bay designated A1, A2 to AN, respectively, and which are located one above the other, that is, tiered. Each of the levels has a plurality of storage compartments arranged in horizontal rows at opposite sides of the aisles. The storage compartments are identified as Lf1 to LfN and Rt1 to RtN, preceded by the level identification depending upon their level location and their position on the left or right side of the aisle as viewed in the drawings.

The warehouse illustrated is designed to store large cargo containers C, for example, containers approximately the size of a railway box car or a truck body. The installation illustrated includes a railway track R for the movement of railway flat cars FC having containers mounted thereon. The railway track is below the first storage level L1 and that portion thereof which is in alignment with the near end of the tier of aisles defines a loading and unloading station. Containers are removed from and deposited on railway cars located at the loading and unloading station by a hoist, designated generally by the reference character H, located immediately above the loading station. The grab G of the hoist is adapted to carry a container and be moved vertically in line with the near ends of the aisles A1 to AN, in what may be referred to as a hoist bay or well W.

In the embodiment shown, the hoist is immovably connected to a part of the warehouse structure. Alternatively, the hoist could be incorporated in a movable hoist trolley, analogous to a hoist trolley of an overhead bridge crane. If so constructed the hoist could be employed to service different storage areas other than those shown in the illustrated embodiment.

Figure 2:
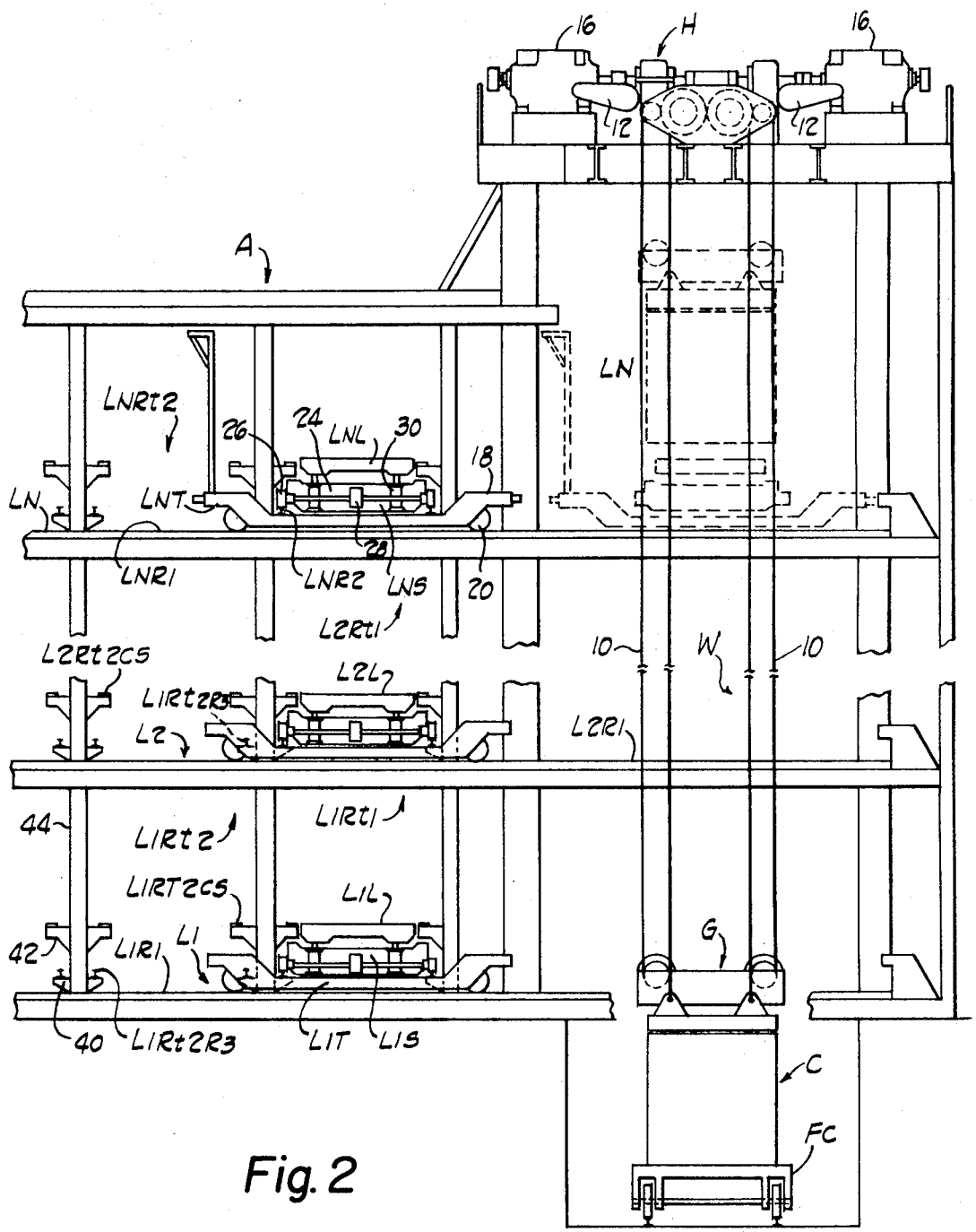
FIG. 2 is a fragmentary view approximately on the line 2-2 of FIG. 1.
Figure 3:
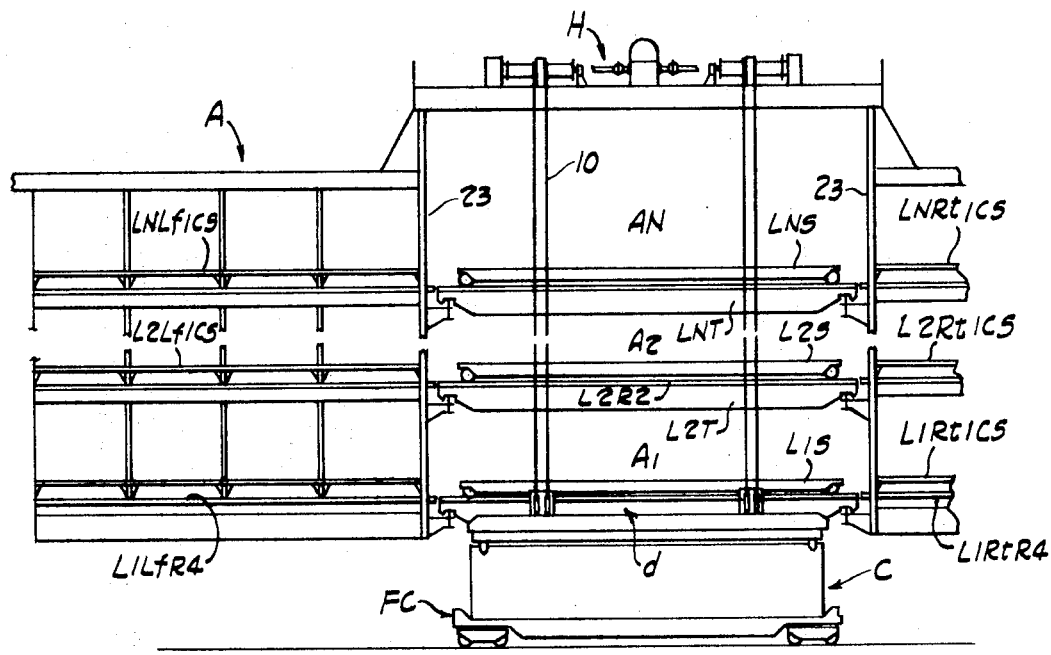
FIG. 3 is a fragmentary view on approximately the line 3-3 of FIG. 1.
Figure 4:
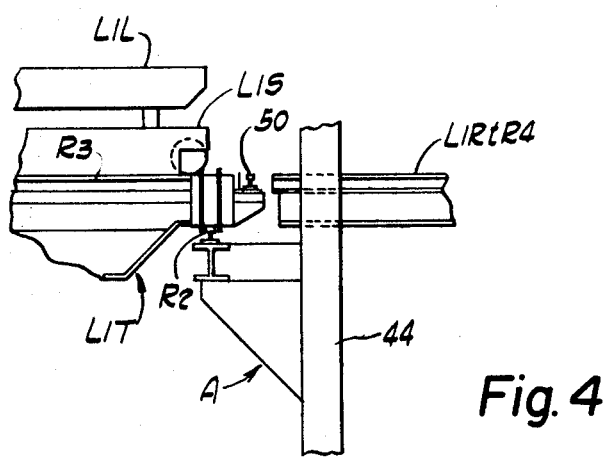
FIG. 4 is an enlarged view of a portion of FIG. 3.

In operation, a container to be stored is elevated by the hoist H to a position above the storage level upon which the container is to be stored, for example, to the position illustrated in phantom lines in FIG. 2, assuming that the storage level is LN.

A transfer car, designated by the reference character T preceded by the level designation, at a hold position on the level and having a shuttle car designated by the reference character S preceded by the level designation thereon provided with an elevatable support, designated by the reference character L preceded by the level designation, is moved along the rails at the respective level which rails are designated by the reference character R1 preceded by the level designation, to a position underneath the container, as illustrated in phantom lines in FIG. 2. The container is then lowered onto the load support of the shuttle car, which support is preferably elevated at the time. The container is then released from the grab and the transfer car moved along the aisle of the level on the rails R1 thereof into alignment with the ultimate storage compartment.

When the container has been moved into alignment with the selected storage compartment the shuttle car upon which the container is resting is moved along the rails on the transfer car, designated by the reference character R2 preceded by the level designation, and the rails in the storage compartment, designated by the reference character R3 preceded by the level and compartment designation, into the storage compartment and the elevatable load support lowered to position the container on the container supports in the compartment, designated by the reference character CS preceded by the level and compartment designation. The shuttle car is thereafter returned to the transfer car and the transfer car returned to the hold position. The hold position is preferably a position immediately adjacent to the hoist bay W, that is, the position illustrated in FIGS. 1 and 2 of the drawings. In the drawings the load supports of the shuttle cars are shown in their raised or partially raised positions for clearness. It is to be understood, however, that with the transfer cars in their hold positions the load supports could be in either their up or down positions.

In taking a container out of storage the operation of the apparatus just described is reversed, that is, a transfer car is moved into alignment with the compartment in which the container to be taken out of storage is positioned. The shuttle car thereon with its load support in its down position is moved into the compartment underneath the container, etc.

The hoist H may be of any conventional construction. As shown it comprises a plurality of cables 10 reeved about suitable sheaves on the grab G and having their one ends anchored to cable slack takeup device 12 and their other ends reeved about cable drums 14 driven by electric motors 16. The grab G may be of any suitable construction and in the embodiment shown it is provided with standard adjustable twist locks for cargo containers. Each of the transfer cars comprise a structural built-up frame 18 having rail-engaging wheels 20 driven by a suitable reversible electric motor 22 for travel along the aisle rails of the respective level in which the transfer car is located. The aisle rails are supported upon vertical structural members 23 of the warehouse at opposite sides of the bay in which the transfer cars move.

Each of the shuttle cars comprise a frame 24 supported by wheels 26 for travel along the rails on the top side of the transfer car upon which it is supported and along the rails of the various storage compartments. The wheels 26 of the shuttle cars are driven by suitable reversible electric motors 28. The load support of the respective shuttle cars is adapted to be moved between its up and down position by reciprocating type hydraulic motors 30 supported on the frames of the respective shuttle cars.

The rails in the various storage compartments, upon which the shuttle cars are adapted to move, are supported in a suitable manner on the warehouse structure as are the container supports at opposite sides of the compartment. A manner of supporting the rails in the storage compartments and the conductor supports therein is illustrated in FIG. 2 of the drawings and comprise brackets 40, 42, respectively, secured to vertical members 44 of the warehouse and located at opposite sides of the storage compartments.

In order to facilitate movement of the shuttle cars to and from the transfer cars, the rails R3 on the transfer cars have end sections, designated by the reference character 50, pivotally connected to the frame of the transfer cars. The sections are selectively movable into positions in alignment with the respective rail of which they are a part to permit transfer of the shuttle cars between the transfer cars and a storage compartment or transversely thereof to permit movement of the transfer car along its respective aisle. The adjoining ends of the rail sections 50 and the rails of the transfer cars of which they are a part and the rails R2 of the storage compartments are bevelled so that the rails will fit closely together during the transfer of a shuttle car to and from its transfer car. The sections 50 can be oscillated by either electric or hydraulic power.

The warehouse is of the automatic electrified type, that is, all of the units are electrically powered and their actuation automatically controlled with manual override. The hydraulic power raising the load supports of the shuttle cars is supplied by electric motor drive pumps on the respective shuttle cars. Electric circuits for supplying power and control for the operation of the various electric motors on the transfer and shuttle cars and the operation of the hydraulic lifts on the shuttle cars include suitable trolley arrangements comprising stationary conductor bars and movable current collectors or shoes carried by the respective cars and slidable along respective conductor bars, as is well known in the art.

From the foregoing disclosure it should be apparent that the present invention is not limited to the particular apparatus illustrated and heretofore described. It will also be apparent that storage aisles could radiate or extend from any one of the four sides of the hoist well W, and that other alternative arrangements could be employed.

What I claim is:

1. In a multilevel storage apparatus having a plurality of horizontally oriented tiered storage bays with a plurality of side-by-side storage compartments opening thereinto and a vertically orientated hoist bay at one end of the storage bays, an overhead hoist in said hoist bay including an elevatable load grab, power means for operating said hoist to raise and lower the grab in the hoist bay, each of the storage bays having rails along opposite sides thereof and extending across the hoist bay, a vehicle roadway below the level of the bottom storage bay intersecting the lower part of the hoist bay and orientated transversely of the length of the storage bays, a transfer car in each of the storage bays movable on the rails therein lengthwise of the storage bay and into and out of the hoist bay, spaced rails in each of the storage compartments along opposite sides thereof and extending transversely of the length of the storage bay into which the respective compartment opens, spaced rails on each of the transfer cars extending transversely of the length of the storage bays in which the transfer car is movable, at least a portion of said rail being movable between a first and second position relative to said transfer car, a shuttle car carried on each of the transfer cars and movable on the rails thereon, power means for moving the transfer cars in their respective storage bays to align the rails thereon with the rails in a storage compartment, power means for moving the shuttle cars between the rails on the transfer cars upon which they are carried and the rails in a storage compartment aligned therewith to move a load into or out of the storage compartment, load supports at opposite sides of each of the storage compartments above the level of the rails thereof, an elevatable load carrier on each of the shuttle cars for depositing a load on or picking up a load from the load supports in a storage compartment into which the shuttle car has been moved, and power means for elevating said load carrier.